United States Patent [19]

Manaka et al.

[11] Patent Number: 4,748,951
[45] Date of Patent: Jun. 7, 1988

[54] APPARATUS FOR AND METHOD OF CONTROLLING THE IDLING OF AUTOMOBILE ENGINE

[75] Inventors: Toshio Manaka; Takeshi Atago, both of Katsuta; Toshio Ishii, Mito, all of Japan

[73] Assignee: Hitachi, Ltd., Tokyo, Japan

[21] Appl. No.: 3,029

[22] Filed: Jan. 13, 1987

[30] Foreign Application Priority Data

Jan. 20, 1986 [JP] Japan ................................ 61-8117

[51] Int. Cl.$^4$ ............................................ F02D 41/16
[52] U.S. Cl. .................................... 123/339; 180/69.3
[58] Field of Search ............... 123/339; 180/69.3, 132, 180/141, 142

[56] References Cited

U.S. PATENT DOCUMENTS

| | | | |
|---|---|---|---|
| 4,492,195 | 1/1985 | Takahashi et al. | 123/339 |
| 4,545,449 | 10/1985 | Fujiwara | 123/339 X |
| 4,582,032 | 4/1986 | Hara et al. | 123/339 |
| 4,617,890 | 10/1986 | Kobayashi et al. | 123/339 |

FOREIGN PATENT DOCUMENTS

| | | | |
|---|---|---|---|
| 81758 | 6/1983 | European Pat. Off. | 123/339 |
| 160138 | 12/1980 | Japan. | |
| 138239 | 7/1985 | Japan | 123/339 |

*Primary Examiner*—Tony M. Argenbright
*Attorney, Agent, or Firm*—Antonelli, Terry & Wands

[57] ABSTRACT

An apparatus for controlling the idling engine speed of an automobile engine comprises: an engine speed sensor for detecting an engine speed; a control unit for calculating a difference between an actual engine speed detected by the sensor and a targeted idling engine speed preset in accordance with the operating conditions of the engine, for judging whether or not a power steering system is being operated to a point close to an operatable limit thereof when the automobile is at a standstill, and for outputting a signal for increasing by a predetermined value a gain of a proportional term for proportional-integral type feedback control employed in controlling the idling engine speed if judgment is made that the power steering system is being operated to a point close to the operatable limit thereof when the automobile is at a standstill; and an ISC valve for adjusting a flow rate of air supplied to the engine in accordance with a signal output by the control unit.

4 Claims, 4 Drawing Sheets

APPARATUS FOR AND METHOD OF CONTROLLING THE IDLING OF AUTOMOBILE ENGINE

BACKGROUND OF THE INVENTION

1. Field of the invention

The present invention relates to an apparatus for and method of controlling the idling of an automobile engine.

2. Description of the related Art

An automobile engine is frequently operated in an idling state. The idling engine speed of the automobile engine is not fixed to a certain value, but is varied in accordance with various conditions of the automoboile, and targeted idling engine speeds are set in advance in accordance with the respective conditions. For instance, when the temperature of engine cooling water is below a predetermined level, the idling engine speed is increased in such a manner that the cooling water temperature promptly reaches the predetermined level. In this case, the targeted idling engine speed is set in correspondence with the cooling water temperature. When an air-conditioner is turned on, the idling engine speed is increased to rotate the compressor of the air-conditioner. The targeted idling engine speed in this case is set in correspondence with the cooling water temperature and the load of the air-conditioner. If the automobile is provided with an automatic transmission, the idling engine speed is varied in accordance with the position of a selector. The targeted idling engine speed at this time is set in correspondence with the cooling water temperature and a load applied to the automatic transmission. The engine speed is returned to the idling engine speed when the cooling water temperature reaches a set level, when the air-conditioner is turned off, or when the selector of the automatic transmission is returned to the neutral position. Control of these operations is generally effected by feed back control.

An apparatus for effecting feedback control is disclosed in Japanese Patent Unexamined Publication No. 160138/1980. This apparatus comprises an ISC valve for supplying air to a combustion chamber of an engine disposed in a bypass line bypassing a throttle valve; a plurality of sensors, including an idle switch for detecting the amount of opening of the throttle valve, an airflow sensor for detecting the flow rate of air supplied to the throttle valve, an engine speed sensor for detecting an engine speed, and a water temperature sensor for detecting the cooling water temperature; and a microcomputer which selects a targeted idling engine speed using the values detected by these sensors and varies an intake air flow rate by actuating the ISC valve so that the engine speed becomes the targeted idling engine speed, and which varies the rate of fuel injected from a fuel injector.

A power steering system is included among auxiliary equipment of an automobile. The power steering system reduces the required manual steering force by means of a booster making use of the negative pressure of the engine. This system applies a large load to the engine in comparison with the air-conditioner or other auxiliary equipment. In particular, the maximum load is applied to the engine when a steering wheel is operated to a point close to its operatable limit when the automobile is at a standstill. For this reason, if the steering wheel is operated to such a point when the automobile is at a standstill, the idling engine speed drops substantially below a set value, possibly resulting in the stalling of the engine. To prevent this engine stall, the performance of the power steering system is controlled in the prior art. In other words, when the automobile is at a stop, the operatable range of the power steering system is reduced so that an excessive load is not applied to the engine, thereby preventing engine stall. It is the time when the automobile is at a stop or is moving very slowly that a large operating range of the steering wheel is required. It is very inconvenient to reduce the operatable range at that time. The apparatus disclosed in the aforementioned Japanese Patent Unexamined Publication No. 160138/1980 does not disclose any measure for coping with the power steering system.

SUMMARY OF THE INVENTION

Accordingly, a primary object of the present invention is to provide an apparatus for and method of controlling the idling of an automobile engine which is capable of operating a power steering system up to its operatable limit without causing an engine stall even when the automobile is at a standstill.

Another object of the present invention is to provide at low cost an apparatus for controlling the idling of an automobile engine which is capable of operating a power steering system up to its operatable limit without causing an engine stall even when the automobile is at a standstill.

To this end, the present invention provides, in accordance with one aspect of the invention, a method of preventing an engine stall, comprising the steps of: detecting the actual engine speed of an engine in an idling state; detecting a difference between the actual engine speed and a targeted idling engine speed preset in accordance with the operating state of the engine; judging by comparing the detected difference and a reference difference whether the power steering system is being operated to a point close to an operatable limit thereof when the automobile is at a standstill; and returning the engine speed speedily to the targeted idling engine speed by increasing by a predetermined value a gain of a proportional term in proportional-integral type feedback control employed in controlling the idling engine speed if judgment is made that the power steering system is being operated at a point close to the operative limit when the automobile is at a standstill.

In accordance with another aspect of the invention, the present invention provides an apparatus for controlling the idling engine speed of an automobile engine comprising: an engine speed sensor for detecting engine speed; a control unit which has means for calculating a difference between actual engine speed as detected by the sensor and a targeted idling engine speed preset in accordance with the operating conditions of the engine, means for judging whether or not a power steering system is being operated at a point close to an operatable limit thereof when the automobile is at a standstill, and means of outputting the signal for increasing by a predetermined value a gain of a proportional term for proportional-integral type feedback control employed in controlling the idling engine speed if judgment is made that the power steering system is being operated at a point close to the operatable limit thereof when the automobile is at a standstill; and adjusting means for adjusting the flow rate of air supplied to the engine in accordance with a signal output by the control unit.

DETAILED DESCRIPTION OF THE PREFERRED EMBODIMENTS

Figure 1:
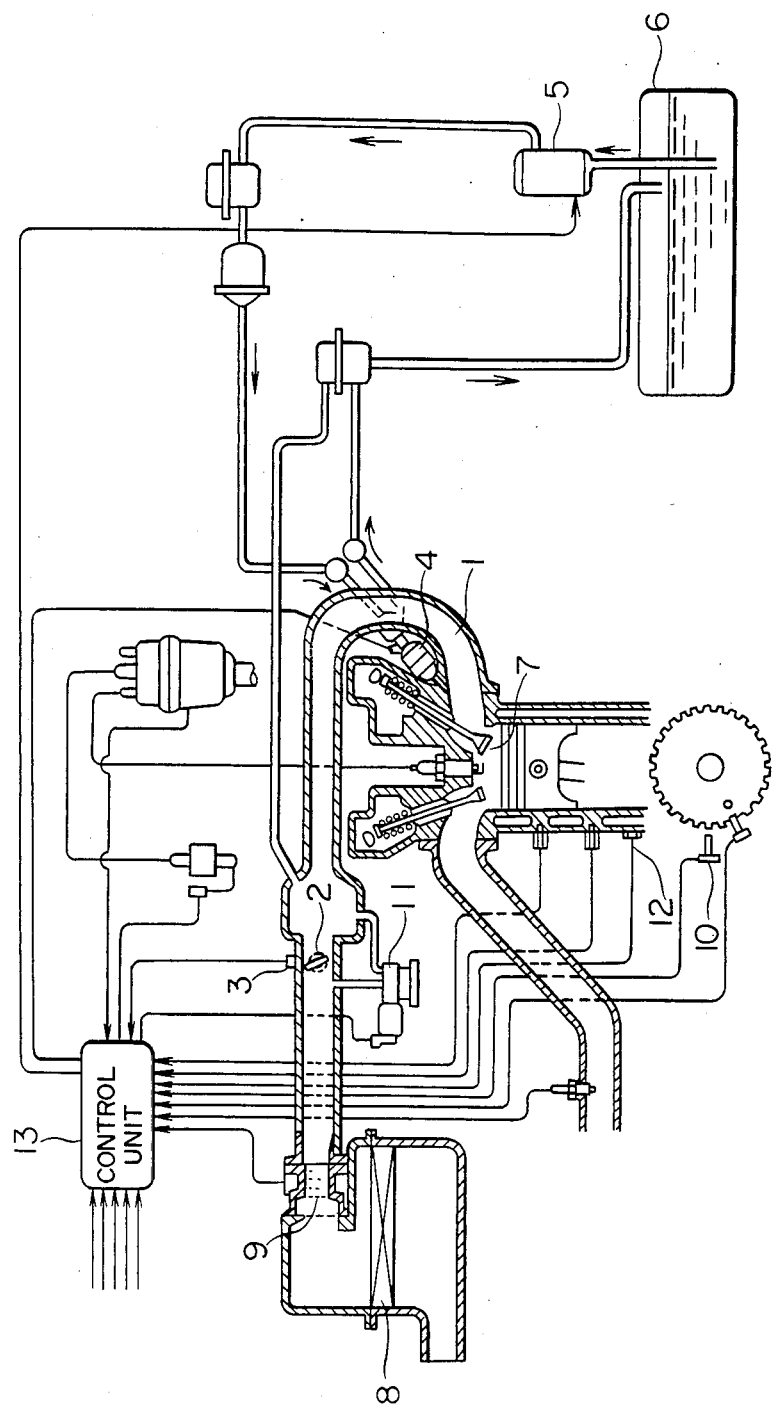
FIG. 1 is a block diagram of an engine system to which an embodiment of the present invention is applied.

FIG. 1 is a diagram of an engine system to which an embodiment of the present invention is applied, and illustrates a gasoline engine employing an electronically controlled fuel injection system. Reference numeral 1 denotes an intake pipe; 2, a throttle valve; 3, an idle switch for detecting that the engine is in an idling state; 4, a fuel injector for injecting fuel into the combustion chamber of the engine; 5, a fuel pump; 6, a fuel tank; 7, a cylinder; 8, an air filter; 9, an airflow sensor for detecting the flow rate of intake air sucked into the cylinder 7 of the engine via the intake pipe 1; 10, an engine speed sensor for detecting engine speed; 11, an ISC valve installed in a bypass line bypassing the throttle valve 2; 12, a water temperature sensor for detecting the cooling water temperature; and 13, a control unit.

Figure 2:
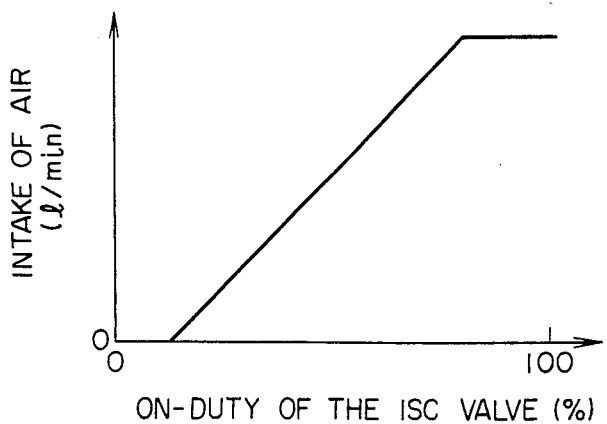
FIG. 2 is a graph illustrating the response characteristics of an ISC valve used in the engine system shown in FIG. 1.
Figure 3:
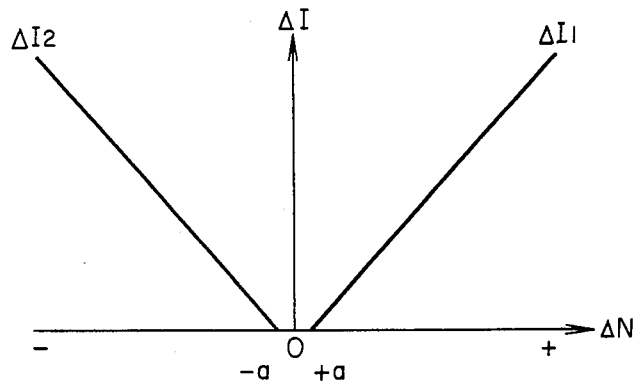
FIG. 3 is a graph illustrating a gain of an integral term in proportional-integral type feedback control employed in controlling an idling engine speed.
Figure 4:
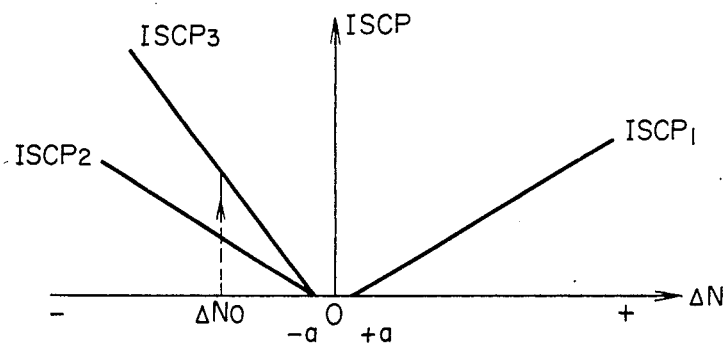
FIG. 4 is a graph illustrating a gain of a proportional term in proportional-integral type feedback control employed in controlling the idling engine speed.
Figure 5:
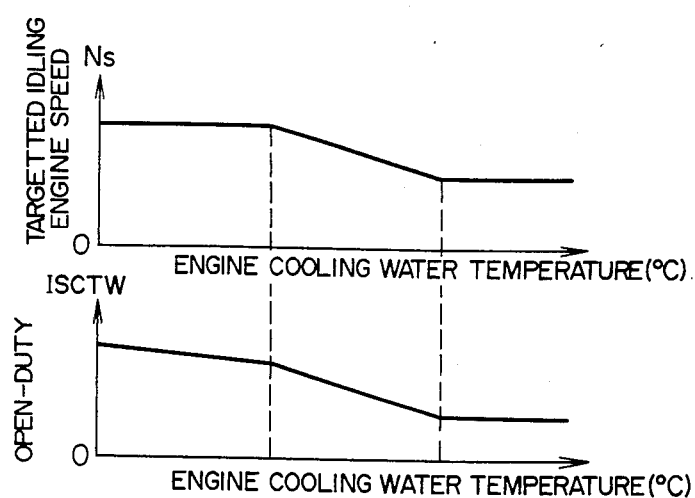
FIG. 5 is a graph illustrating characteristics of targeted idling engine speeds and basic values of open-duty with respect to the temperature of engine cooling water.

The idle switch 3 detects that the engine is in the idling state by detecting that the throttle valve 2 has been returned to its idle position. The ISC valve 13 controls the idling engine speed by controlling the flow rate of air flowing to the cylinder 7 when the engine is in the idling state. FIG. 2 shows the response characteristics of the ISC valve 11, and shows that the air intake flow rate increases substantially linearly vis-a-vis changes in the on-duty ranging from 0% to the vicinity of 100%. The control unit 13 effects control of the air-fuel ratio by calculating an optimum fuel supply rate in accordance with data an such as an intake air flow rate detected by the airflow sensor 9, engine speed detected by the engine speed sensor 10, and the cooling water temperature detected by the water temperature sensor 12 and by outputting a relevant signal to the fuel injector 4. At the same time, when the idle switch 3 detects that the throttle valve 2 has returned to the idle position, i.e., that the engine is in the idling state, the control unit 13 effects feedback control by outputting an intake air flow rate control signal to the ISC valve 11 in accordance with data on the engine speed output from the engine speed sensor 10, whereby idling engine speeds converge to a given targeted value. The so-called proportional-integral type control is employed as a feedback control, and gains in integral and proportional terms are respectively set as shown in FIGS. 3 and 4. An ISC on-duty during idling is expressed as a sum of an open-duty ISCTW, an integral term ISCI, and a proportional term ISCP. The targeted idling engine speed Ns and the open-duty ISCTW with respect to the engine cooling water temperature are set as shown in FIG. 5. The idling engine speed is varied in accordance with the load applied to the engine, as mentioned above. In other words, the idling engine speed declines if the load is applied. This amount of decline is proportional to the magnitude of the load. The load that causes the idling engine speed to decline most is that of the power steering system. Therefore, a measurement is made in advance of an amount of decline in the idling engine speed at the time when the power steering system is operated when the automobile is at a stop, and the amount thus measured is set as a reference difference $\Delta No$. If a comparison is made between the same and an actual amount of decline $\Delta N$, it becomes possible to determine whether or not the power steering system has been operated when the automobile is at a stop. This reference difference $\Delta No$ is stored in advance in the memory of the control unit 13.

As mentioned above, the proportional-integral type feedback control is used in controlling the idling engine speed. A gain $\Delta I$ of an integral term is given in accordance with a difference $\Delta N$ between a targeted idling engine speed Ns and an actual engine speed N, as shown in FIG. 3. Similarly, a gain ISCP of a proportional term is also given in correspondence with the difference $\Delta N$ between the targeted idling engine speed Ns and the actual engine speed N. These characteristics are stored in the memory of the control unit 13.

In cases where the difference $\Delta N$ between the targeted idling engine speed and the actual engine speed is positive, i.e., when the actual engine speed is greater than the targeted idling engine speed, $\Delta I_1$ is used for the gain of the integral term, while $ISCP_1$ is used for the gain of the proportional term. In cases where the difference $\Delta N$ between the two speeds is negative, i.e., when the actual engine speed is less than the targeted idling engine speed, $\Delta I_2$ is used for the gain of the integral term, while $ISCP_2$ is used for the gain of the proportional term. However, in cases where the difference $\Delta N$ between the targeted idling engine speed Ns and the actual engine speed N is negative, and where its absolute value $|\Delta N|$ is greater than the aforementioned reference difference $\Delta No$, a setting is made such that $ISCP_3$, which is a greater gain than $ISCP_2$, is used for the gain of the proportion term. These characteristics are stored in the memory of the control unit 13.

Figure 6:
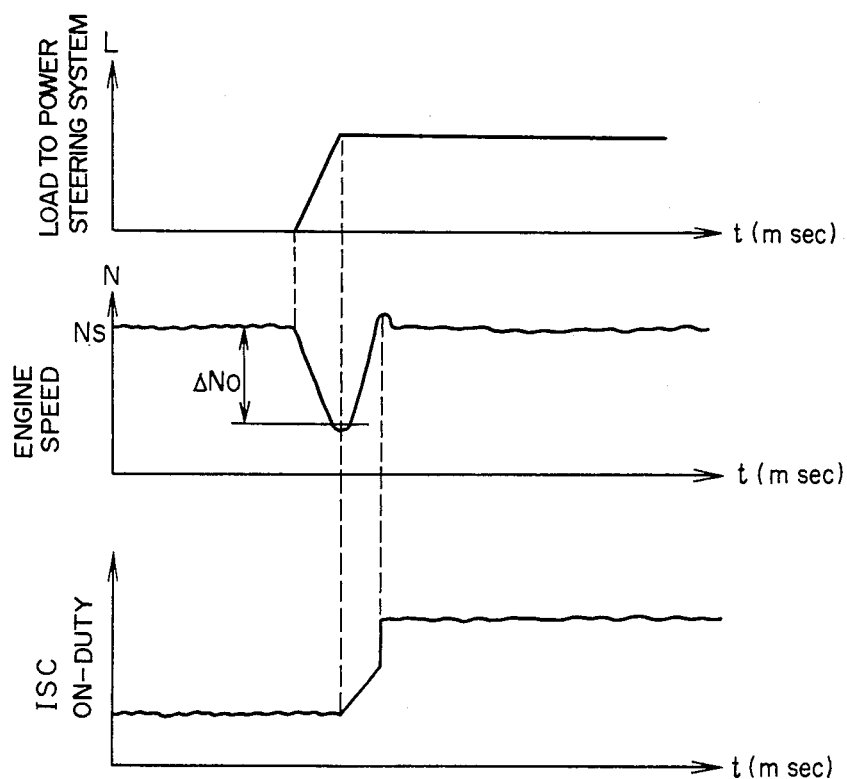
FIG. 6 is a diagram explaining a gain changeover operation in accordance with the present invention.
Figure 7:
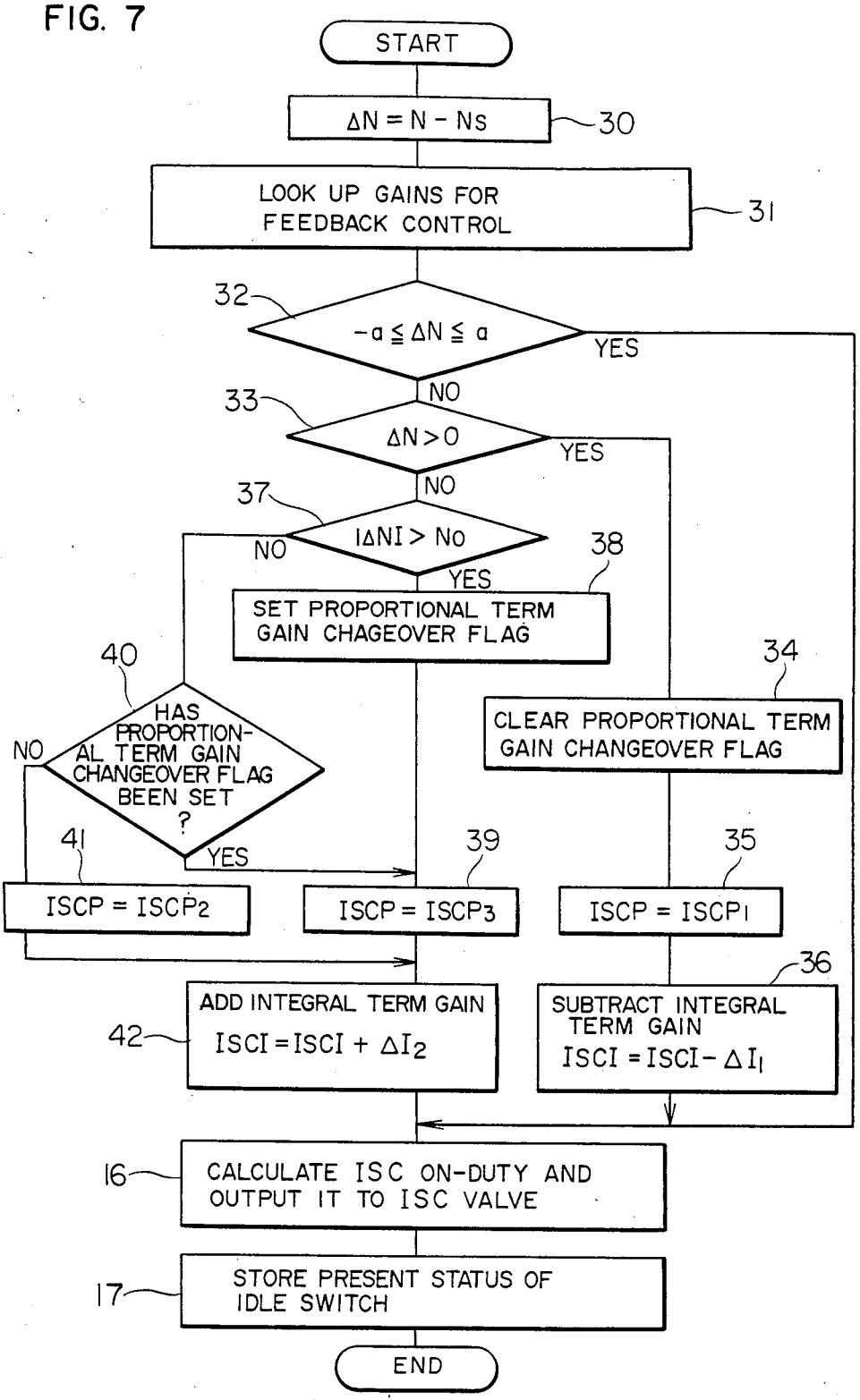
FIG. 7 is a flowchart illustrating the operational procedures in accordance with the present invention.

With reference to FIGS. 6 and 7, operation will be described hereinafter.

First, judgment is made from a signal supplied from the idle switch 3 as to whether or not the engine is in the idling state. When in the idling state, the difference $\Delta N$ between the targeted idling engine speed Ns and the actual engine speed N is measured. The difference $\Delta N$ is compared with the reference difference $\Delta No$ stored in the memory of the control unit 13. As a result, if the absolute value of the difference $\Delta N$ is greater than the reference difference $\Delta No$, judgment is made that the steering wheel is being operated when the automobile is at a stop. At that juncture, the gain of the proportional term of a control signal for the ISC valve 11 is increased by a predetermined value. In accordance with the signal, the ISC valve 11 adjusts the flow rate of air supplied to the engine. Consequently, the engine speed is quickly returned to the targeted idling engine speed, thereby preventing an engine stall.

The above-mentioned operation will be described with reference to the flowchart shown in FIG. 7. The operation described in FIG. 7 is repeated for each 40 milliseconds. First, in Step 30, the difference $\Delta N$ between the targeted idling engine speed Ns and the actual engine speed N is determined. Then, in Step 31, gains in the proportional and integral terms are looked up, and are stored in the memory of the control unit 13. Judgment is made in Step 32 as to whether or not the difference $\Delta N$ is within a tolerance of $\pm a$. If it is within the tolerance, the operation proceeds to Step 16 to output a signal of the ISC on-duty of 40 milliseconds ago, and the current state of the idle switch is stored, thereby completing the operation.

If the difference $\Delta N$ is outside the tolerance, the operation proceeds to Step 32, where judgment is made as to whether the difference $\Delta N$ is positive or negative. If positive, a proportional term gain changeover flag is cleared in Step 34, ISCP$_1$ is set as the gain of the proportional term in Step 35, the gain $\Delta I_1$ of the integral term is subtracted in Step 36, the ISC on-duty is calculated (ISCON = ISCTW + ISCI + ISCP) in Step 16, and the current state of the idle switch is stored, thereby completing the operation.

If the difference $\Delta N$ is found to be negative in Step 33, judgment is made in Step 37 as to whether or not the absolute value of the difference $\Delta N$ is greater than the reference difference $\Delta No$. If the absolute value of the difference $\Delta N$ is greater than the reference difference $\Delta No$, the proportional term gain changeover flag is set in Step 38, ISCP$_3$ is set as the gain of the proportional term in Step 39, the gain $\Delta I_2$ of the integral term is added in Step 42, the ISC on-duty is calculated, as described before, and is output in Step 16, and the operation proceeds to Step 17, thereby completing the operation.

If it is judged in Step 37 that the absolute value of the difference $\Delta N$ is less than the reference difference $\Delta No$, the operation proceeds to Step 40, where judgment is made as to whether or not the proportional term gain changeover flag has been set. If set, the operation returns to Step 39, and the above-described operation is carried out, thereby completing the operation. On the other hand, if the proportion term gain changeover flag has not been set, ISCP$_2$ is set as the gain of the proportional term in Step 41, the gain $\Delta I_2$ of the integral term is added in Step 42, and the operation is completed via Steps 16 and 17.

Accordingly, through these operations it is possible to obtain control shown in FIG. 6, with the result that it is possible to control a decline in the idling engine speed even when the load fluctuates sharply, thereby making it possible to prevent the occurrence of an engine stall.

What is claimed is:

1. A method of preventing an engine stall, comprising the steps of:
   detecting an actual engine speed of an engine in an idling state;
   detecting a difference between said actual engine speed and a targeted idling engine speed preset in accordance with an operating state of said engine;
   judging by comparing said detected difference and a reference difference whether a power steering system is being operated close to an operative limit thereof when said automobile is at a standstill; and
   returning said engine speed rapidly to said targeted idling engine speed by increasing by a predetermined value the gain of a proportional term in proportional-integral type feedback control employed in controlling the idling engine speed if judgment is made that said power steering system is being operated close to said operative limit when said automobile is at a standstill.

2. A method according to claim 1, wherein said reference difference is a predetermined value of an amount of decline in said idling engine speed when said power steering system is operated close to its operative limit when said automobile is at a standstill.

3. A method according to claim 1, wherein said power steering system is judged as being operated close to its operative limit when said automobile is at a standstill when said detected difference is greater than said reference difference.

4. An apparatus for controlling the idling engine speed of an automobile engine, comprising:
   an engine speed sensor for detecting engine speed;
   a control unit including means for calculating a difference between an actual engine speed detected by said engine speed sensor and a targeted idling engine speed preset in accordance with an operating condition of said engine, means for detecting whether or not a power steering system is being operated close to an operative limit thereof when said automobile is at a standstill by comparing said calculated difference and a predetermined reference difference, and means for outputting a signal for increasing by a predetermined value the gain of a proportional term for proportional-integral type feedback control employed in controlling the idling engine speed in response to said power steering system is being operated close to said operative limit thereof when said automobile is at a standstill as indicated by said judging means; and
   adjusting means for adjusting the flow rate of air supplied to said engine in accordance with said signal output by said control unit.

* * * * *